United States Patent [19]

Mertz

[11] 3,794,380
[45] Feb. 26, 1974

[54] SEAT BACK ANGLE ADJUSTER AND LATCH

[75] Inventor: Edward H. Mertz, Birmingham, Mich.

[73] Assignee: General Motors Corporation, Detroit, Mich.

[22] Filed: June 15, 1972

[21] Appl. No.: 262,953

[52] U.S. Cl................. 297/379, 16/146, 297/354, 297/364
[51] Int. Cl........................... B60n 1/02, A47c 3/00
[58] Field of Search.................. 297/353–355, 366, 297/367, 372, 378, 379; 16/146, 149

[56] References Cited
UNITED STATES PATENTS

| | | | |
|---|---|---|---|
| 3,635,525 | 1/1972 | Magyar | 297/354 |
| 3,353,868 | 11/1967 | Pigeon et al. | 297/378 X |
| 3,455,602 | 7/1969 | Cruz et al. | 297/354 |
| 2,959,206 | 11/1960 | Tedesco | 297/367 |

Primary Examiner—Casmir A. Nunberg
Attorney, Agent, or Firm—Herbert Furman

[57] ABSTRACT

A seat back angle adjuster and latch for a vehicle seat including a seat back having laterally spaced inboard and outboard support arms pivotally supporting the seat back for movement between use and easy enter positions. The seat back angle adjuster includes a two-position lever operated cam which is pivotally mounted on the seat frame and engages the inboard support arm to selectively define first and second angular use positions of the seat back relative the vertical. A seat back latch lever pivotally mounted on the outboard support arm has a pair of spaced recesses selectively engaging a pin extending from the seat frame to lock the seat back in either of the first or second use positions defined by the angle adjuster.

2 Claims, 3 Drawing Figures

PATENTED FEB 26 1974  3,794,380

SEAT BACK ANGLE ADJUSTER AND LATCH

The invention relates to a vehicle seat and more particularly to an angle adjuster and latch for a vehicle seat back.

It is known to provide a vehicle seat having a pivoted seat back which is adjustable to be disposed in different angular use positions relative to the vertical. It is also known to provide a vehicle seat having a pivoted seat back and a latch assembly which locks the seat back in its use position and is operable to release the seat back for forward pivotal movement to an easy-enter position facilitating access to the rear seat. Furthermore, it is known to provide a vehicle seat having a seat back pivotally supported at its lower portion by an angle adjuster and pivotally supported at an upper portion by a seat back latch.

The present invention provides a seat back having laterally spaced inboard and outboard support arms pivoted to the seat frame, a seat back angle adjuster acting between the seat frame and one of the support arms, and a seat back latch acting between the seat frame and the other support arm.

A vehicle seat according to the invention has a seat cushion mounted on a seat frame which is in turn mounted on the vehicle floor by a conventional seat adjuster. The seat back has a back cushion and includes laterally spaced inboard and outboard support arms pivotally mounted to the seat frame. The seat back angle adjuster includes a two-position lever-operated cam which is pivotally mounted on the seat frame and engages the inboard support arm to selectively define first and second angular use positions of the seat back relative the seat cushion. A seat back latch lever is pivotally mounted on the outboard support arm of the seat back and has a pair of spaced recesses therein permitting selective engagement of the latch lever with a pin extending from the seat base to lock the seat back in either of the first or second angular use positions thereof defined by the angle adjuster. A spring biases the latch lever toward engagement with the pin. When the latch lever is manually rotated about its pivotal mount and against the bias of the spring, it is disengaged from the pin and the seat back may be pivoted forwardly to the easy-enter position.

When the seat back is in its easy-enter position, the adjuster cam may be rotated about its pivotal mount to the position thereof which will provide the angular use position of the seat back desired by the seat occupant. When the seat back is pivoted rearwardly the inboard support arm engages the adjuster cam to define the angular use position of the seat back. During such rearward movement of the seat back, curved surfaces on the latch lever adjacent the recesses thereof cam the latch lever over the pin against the bias of the spring until the pin is engaged by the latch lever in the recess thereof corresponding to the seat back angle defined by the adjuster cam.

One feature of the invention is a seat back having laterally spaced support arms pivoted to the seat base with one of the support arms supported by an adjuster cam defining the seat back angle and the other support arm having a latch lever connected thereto which locks the seat back in the angle thereof defined by the adjuster cam.

A further feature of the invention is a seat back angle-adjuster and latch mechanism which supports both laterally spaced support arms of a seat back from rearward movement past the selected angular use position of the seat back.

These and other features, objects, and advantages of the invention will become apparent upon consideration of the specification and appended drawings in which.

Figure 1:
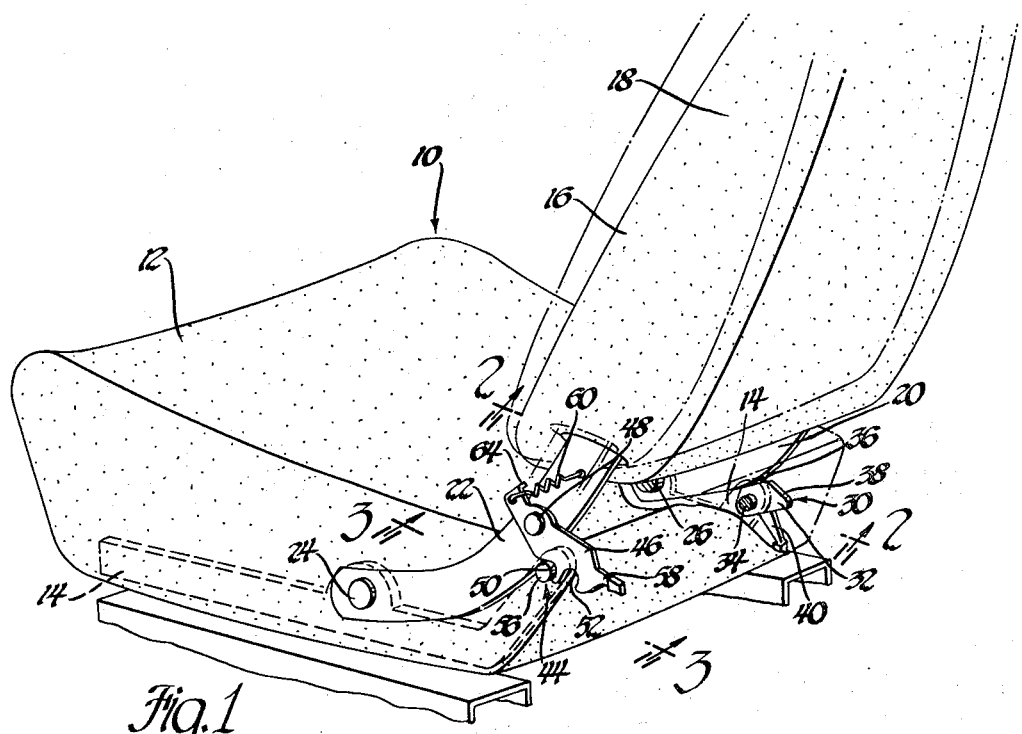
FIG. 1 is a partially broken away perspective view of a vehicle seat according to the invention.

Referring now to FIG. 1, a conventional vehicle front seat generally indicated at 10 includes a seat cushion 12 having a conventional frame 14 which is in turn mounted to the floor of a motor vehicle by a conventional seat adjusting assembly not shown. The vehicle seat 10 also includes a seat back 16 including a back cushion 18 mounted on laterally spaced J-shaped support arms 20 and 22. The inboard support arm 20 and outboard support arm 22 are respectively attached to the seat frame 14 by pivots 24 and 26 which permit pivotal movement of the seat back 16 between the full line and phantom line use positions of FIG. 1 and a forwardly tilted easy-enter position, not shown, permitting ease of occupant entry to and egress from the rear seat of the vehicle.

Figure 2:
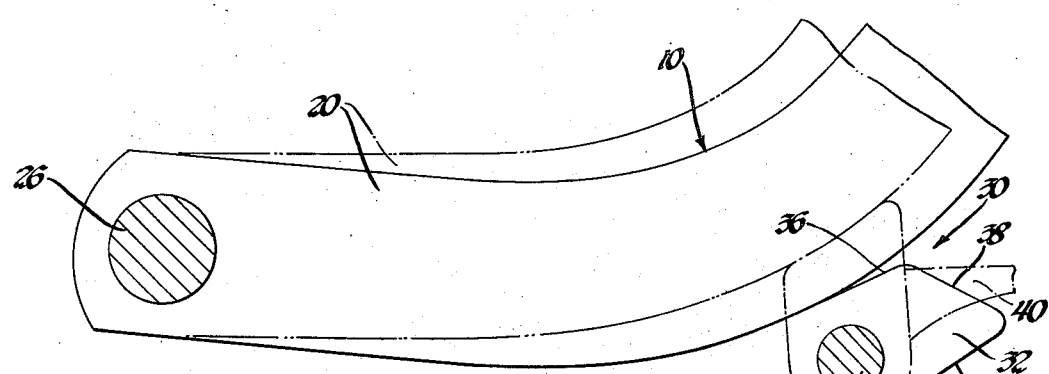
FIG. 2 is a sectional view taken in the direction of arrows 2—2 of FIG. 1.

Referring to FIGS. 1 and 2, an angle adjuster mechanism indicated generally at 30 selectively defines the angle of the seat back 16 when in use position. The seat back angle adjuster 30 includes an adjuster cam 32 pivotally mounted to the seat frame 14 by pivot 34. Adjuster cam 32 includes first and second discrete cam surfaces 36 and 38 which are selectively engageable with the inboard support arm 20. An operating lever 40 attached to the adjuster cam 32 facilitates its rotation between a first position wherein first cam surface 36 engages inboard support arm 20 to define a first angular use position of the seat back 16 as shown in solid lines in FIGS. 1 and 2 and a second position wherein second cam surface 38 engages the inboard support arm 20 to position the seat back in the phantom line indicated second angular use position.

Figure 3:
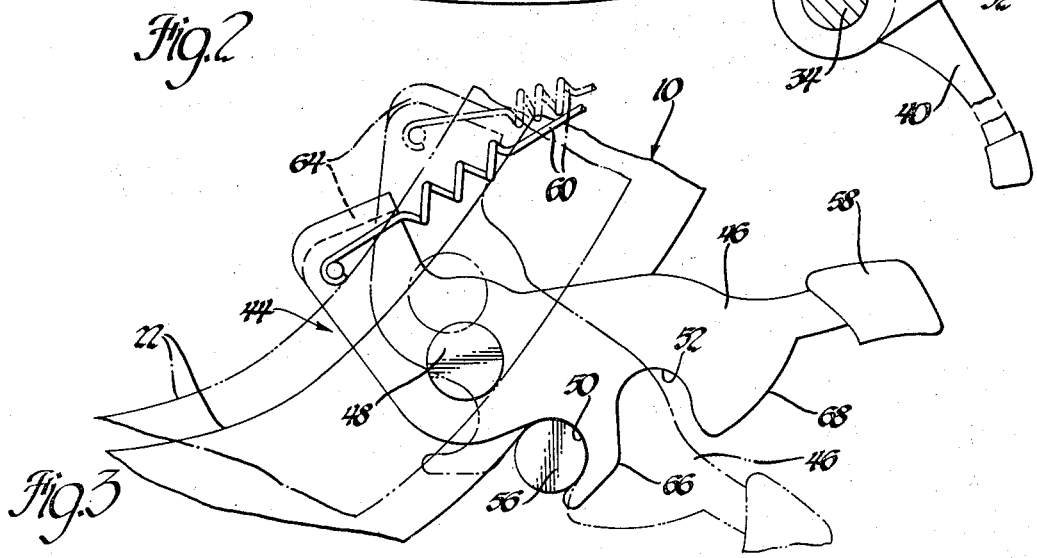
FIG. 3 is a sectional view taken in the direction of arrows 3—3 of FIG. 1.

Referring now to FIGS. 1 and 3, a latch assembly generally indicated at 44 locks the seat back in use position. The latch assembly 44 includes a latch lever 46 pivotally mounted on the outboard support arm 22 of the seat back 16 by a pivot 48. The latch lever 46 also includes semi-circular recesses 50 and 52 which selectively receive and capture a pin 56 mounted on the seat frame 14 to lock the seat back.

When the seat back 16 is in the first angular use position shown in solid lines and defined by engagement of first cam surface 36 of adjuster cam 32 with inboard support arm 20, the pin 56 is received in the recess 50 of the latch lever 46. In this first angular use position, the outboard support arm 22 engages the pin 56 as best seen in FIG. 3 so that the seat back 16 is positively restrained from rearward movement past the first use position. The rearward wall of recess 50 is so disposed as to capture pin 56 and thereby restrain the latch lever 46 and the outboard support arm 22 connected thereto from pivotal movement in the forward direction.

When the seat back 16 is in the second angular use position indicated by phantom lines, the pin 56 is received within recess 52 of the latch lever. The walls of recess 52 are so disposed as to capture and restrain the latch lever 46 and the outboard support arm 22 connected thereto from pivotal movement in either the forward or rearward direction. A handle 58 on the latch lever 46 facilitates its manual rotation about pivot 48 and consequent disengagement from the pin 56 so that the seat back 16 may be pivoted forwardly to its easy-enter position. A spring 60 acting between the latch lever 46 and the outboard support arm 22 biases latch lever 46 in the pin 56 engaging direction until limited by engagement of a flange 64, FIG. 1, of latch lever 46 with the outboard support arm 22. The latch lever 46 includes cam surfaces 66 and 68 respectively rearwardly of the recesses 50 and 52 which engage pin 56 to cam the lever 46 in the pin disengaging direction when the seat back 16 is returned from the easy-enter position. This causes the latch lever 46 to hop over the pin 56 until the seat back 16 reaches its angular use position defined by the angle adjuster mechanism 30.

What is claimed is:

1. A vehicle seat comprising a seat back having laterally spaced support arms, means pivotally attaching the support arms to the seat frame for permitting pivotal movement of the seat back between a plurality of angular use positions of the seat back relative the seat frame and a forwardly pivoted easy-enter position, an adjuster cam having a plurality of discrete cam surfaces, pivot means mounting the adjuster cam on the seat frame for movement to a position wherein a selected one of the plurality of discrete cam surfaces engages one of the support arms to define the angular use position of the seat back relative the seat frame, a latch lever having a plurality of spaced recesses therein, pivot means mounting the latch lever on the other of the support arms, means on the seat frame normally engaged in one of the plurality of spaced recesses of the latch lever to lock the seat back in the angle thereof defined by the selected one of the plurality of discrete cam surfaces, the latch lever being pivotable out of engagement with the seat frame means to permit pivotal movement of the seat back to easy-enter position.

2. A vehicle seat comprising a seat frame, a seat back having laterally spaced support arms, means pivotally attaching the support arms to the seat frame for pivotal movement of the seat back between use position and an easy-enter position forwardly of use position, adjuster cam means pivotally mounted on the frame and manually movable to first or second positions supportably engaging one of the support arms from rearward pivotal movement to define first and second angular use positions of the seat back relative the seat frame, a latch lever pivotally mounted on the other support arm and having first and second recesses therein, means on the seat frame engageable within the first or second recesses of the latch lever, spring means biasing the latch lever into engagement with the means on the seat frame to lock the seat back in the respective angular use position thereof defined by the adjuster cam means, a handle on the latch lever permitting rotation of the latch lever and disengagement from the means on the seat frame to permit forward pivotal movement of the seat back to the easy-enter position, and cam surfaces on the latch lever rearwardly the first and second recesses engaging the means on the seat frame to rotate the latch lever against the bias of the spring during rearward pivotal movement of the seat back from the easy-enter position.

* * * * *